US011082306B2

(12) United States Patent
Shah et al.

(10) Patent No.: US 11,082,306 B2
(45) Date of Patent: Aug. 3, 2021

(54) SYSTEM AND METHOD OF PROVISIONING, UPGRADING AND TRACKING SOLUTIONS IN A MULTI TENANTED PLATFORM

(71) Applicant: Tata Consultancy Services Limited, Mumbai (IN)

(72) Inventors: Viral Prakash Shah, Thane (IN); Narayanaswamy Krishnan, Chennai (IN); Kumar Palanichamy, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 15/929,845

(22) Filed: May 26, 2020

(65) Prior Publication Data

US 2020/0389374 A1 Dec. 10, 2020

(30) Foreign Application Priority Data

May 29, 2019 (IN) .............................. 201921021328

(51) Int. Cl.
*H04L 12/24* (2006.01)
(52) U.S. Cl.
CPC ...... *H04L 41/5054* (2013.01); *H04L 41/5032* (2013.01); *H04L 41/5074* (2013.01)
(58) Field of Classification Search
CPC ............. H04L 41/0893; H04L 41/5051; H04L 41/5054
See application file for complete search history.

(56) References Cited

U.S. PATENT DOCUMENTS

| 5,881,131 A | 3/1999 | Farris et al. |
|---|---|---|
| 2009/0193433 A1 | 7/2009 | Maes |
| 2014/0040975 A1 | 2/2014 | Raleigh et al. |
| 2014/0075031 A1* | 3/2014 | Doering .................. H04L 47/70 709/226 |
| 2014/0101013 A1* | 4/2014 | Baset ..................... G06Q 40/00 705/35 |
| 2014/0280905 A1 | 9/2014 | Bryan et al. |
| 2016/0034809 A1 | 2/2016 | Trenholm et al. |
| 2017/0063615 A1 | 3/2017 | Yang et al. |
| 2020/0150939 A1* | 5/2020 | Strimpel ................... G06F 8/61 |

* cited by examiner

*Primary Examiner* — William G Trost, IV
*Assistant Examiner* — Christopher P Cadorna
(74) *Attorney, Agent, or Firm* — Finnegan, Henderson, Farabow, Garrett & Dunner LLP (57) ABSTRACT

Embodiments of the present disclosure, implements method of provisioning set of solutions in a multi tenanted platform, by (a) receiving, a request for the set of solutions; (b) generating, a ticket for the request associated with at least one solution from the set of solutions; (c) selecting, a bundle based on the requested associated with the at least one solution; (d) provisioning, the selected bundle by the ticket for the at least one requested solution to obtain a provisioned bundle; (e) scheduling, the provisioning queue table at a predefined interval to obtain a plurality of provisioning records; (f) determining, at least one class for the provisioned bundle from the plurality of provisioning records; (g) provisioning, the at least one requested solution and a solution table is created in the schema; and (h) updating, status of the provisioning and notifying to a user.

12 Claims, 9 Drawing Sheets

SYSTEM AND METHOD OF PROVISIONING, UPGRADING AND TRACKING SOLUTIONS IN A MULTI TENANTED PLATFORM

PRIORITY CLAIM

This U.S. patent application claims priority under 35 U.S.C. § 119 to: India Application No. 201921021328, filed on May 29, 2019.

TECHNICAL FIELD

This disclosure relates generally to information technology, and, more particularly, to system and method of provisioning, upgrading and tracking solutions in a multi tenanted platform.

BACKGROUND

In current scenario, plurality of configuration steps such as database creation, enabling bundles for the customer, table creation, scripts execution, users and user group creation for the customer, user group mapping for access to various modules/functionalities are error prone since much manual work is involved. Time taken to enable a customer is more. Manual process of provisioning requires frequent server access by developers. There is dependency on solutions team for provisioning. There are neither provisioning standards or guidelines nor option to provision two or more customers simultaneously due to manual process and infrastructure limitations. Current technologies have restriction in terms, adding any new components to the already provisioned request in future based on the customer request. Different source code and deliverables deployment methods have been used, however these have resulted in leading to more maintenance and cost.

SUMMARY

Embodiments of the present disclosure present technological improvements as solutions to one or more of the above-mentioned technical problems recognized by the inventors in conventional systems. For example, in one aspect, processor implemented method for provisioning set of solutions in a multi tenanted platform is provided. The processor implemented method includes (a) receiving, via one or more hardware processors, a request for the set of solutions; (b) generating, via the one or more hardware processors, a ticket for the request associated with at least one solution from the set of solutions; (c) selecting, via the one or more hardware processors, a bundle based on the requested associated with the at least one solution; (d) provisioning, via the one or more hardware processors, the selected bundle by the ticket for the at least one requested solution to obtain a provisioned bundle; (e) scheduling, via the one or more hardware processors, the provisioning queue table at a predefined interval to obtain a plurality of provisioning records; (f) determining, via the one or more hardware processors, at least one class for the provisioned bundle from the plurality of provisioning records; (g) provisioning, via the one or more hardware processors, the at least one requested solution and a solution table is created in the schema; and (h) updating, via the one or more hardware processors, status of the provisioning and notifying to a user. In an embodiment, the provisioned bundle includes a provisioning queue table which is stored in a schema. In an embodiment, the at least one class corresponds to at least one of (i) a bundle level class, (ii) a solution specific class, and combination thereof.

In an embodiment, a solution provisioning class may execute at least one script in a newly created schema to perform solution specific activities. In an embodiment, the method may further include provisioning a pre-configured workflow for the selected solution. In an embodiment, the method may further include provisioning a report for the provisioned solutions.

In another aspect, there is provided a processor implemented system to provision set of solutions in a multi tenanted platform. The system comprises a memory storing instructions; one or more communication interfaces; and one or more hardware processors coupled to the memory via the one or more communication interfaces, wherein the one or more hardware processors are configured by the instructions to: (a) receive, a request for the set of solutions; (b) generate, a ticket for the request associated with at least one solution from the set of solutions; (c) select, a bundle based on the requested associated with the at least one solution; (d) provision, the selected bundle by the ticket for the at least one requested solution to obtain a provisioned bundle; (e) schedule, the provisioning queue table at a predefined interval to obtain a plurality of provisioning records; (f) determine, at least one class for the provisioned bundle from the plurality of provisioning records; (g) provision, the at least one requested solution and a solution table is created in the schema; and (h) update, status of the provisioning and notify to a user. In an embodiment, the provisioned bundle includes a provisioning queue table which is stored in a schema. In an embodiment, the at least one class corresponds to at least one of (i) a bundle level class, (ii) a solution specific class, and combination thereof.

In an embodiment, a solution provisioning class may execute at least one script in a newly created schema to perform solution specific activities. In an embodiment, the one or more hardware processors may further configured to provision a pre-configured workflow for the selected solution. In an embodiment, the one or more hardware processors may further configured to provision a report for the provisioned solutions.

In yet another aspect, there are provided one or more non-transitory machine readable information storage mediums comprising one or more instructions which when executed by one or more hardware processors causes (a) receiving, via one or more hardware processors, a request for the set of solutions; (b) generating, via the one or more hardware processors, a ticket for the request associated with at least one solution from the set of solutions; (c) selecting, via the one or more hardware processors, a bundle based on the requested associated with the at least one solution; (d) provisioning, via the one or more hardware processors, the selected bundle by the ticket for the at least one requested solution to obtain a provisioned bundle; (e) scheduling, via the one or more hardware processors, the provisioning queue table at a predefined interval to obtain a plurality of provisioning records; (f) determining, via the one or more hardware processors, at least one class for the provisioned bundle from the plurality of provisioning records; (g) provisioning, via the one or more hardware processors, the at least one requested solution and a solution table is created in the schema; and (h) updating, via the one or more hardware processors, status of the provisioning and notifying to a user. In an embodiment, the provisioned bundle includes a provisioning queue table which is stored in a schema. In an embodiment, the at least one class corresponds to at least one of (i) a bundle level class, (ii) a solution specific class, and combination thereof.

In an embodiment, a solution provisioning class may execute at least one script in a newly created schema to perform solution specific activities. In an embodiment, the method may further include provisioning a pre-configured workflow for the selected solution. In an embodiment, the method may further include provisioning a report for the provisioned solutions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

A provisioning process is a back-end process to enable a bundle for a customer. The bundle is a logical grouping of plurality of solutions. Further, one class each is provided for provisioning by plurality of bundles and plurality of solution components. A provisioning framework invoke bundle level and solution component level provisioning classes.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

Figure 1:
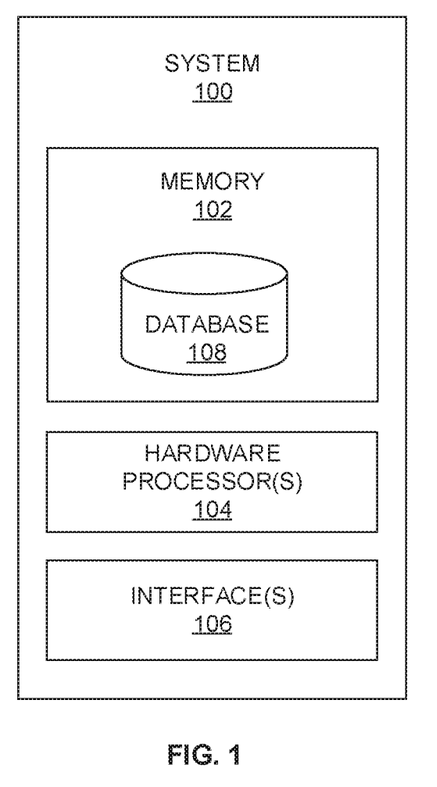
FIG. 1 is a block diagram illustrates a system for provisioning, upgrading and tracking solutions in a multi tenanted platform according to embodiments of the present disclosure.

FIG. 1 is a block diagram illustrates a system 100 for provisioning, upgrading and tracking solutions in a multi tenanted platform according to embodiments of the present disclosure. In an embodiment, the system 100 includes one or more processors 104, communication interface device (s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, information associated with a plurality of provisioning components of plurality of user. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
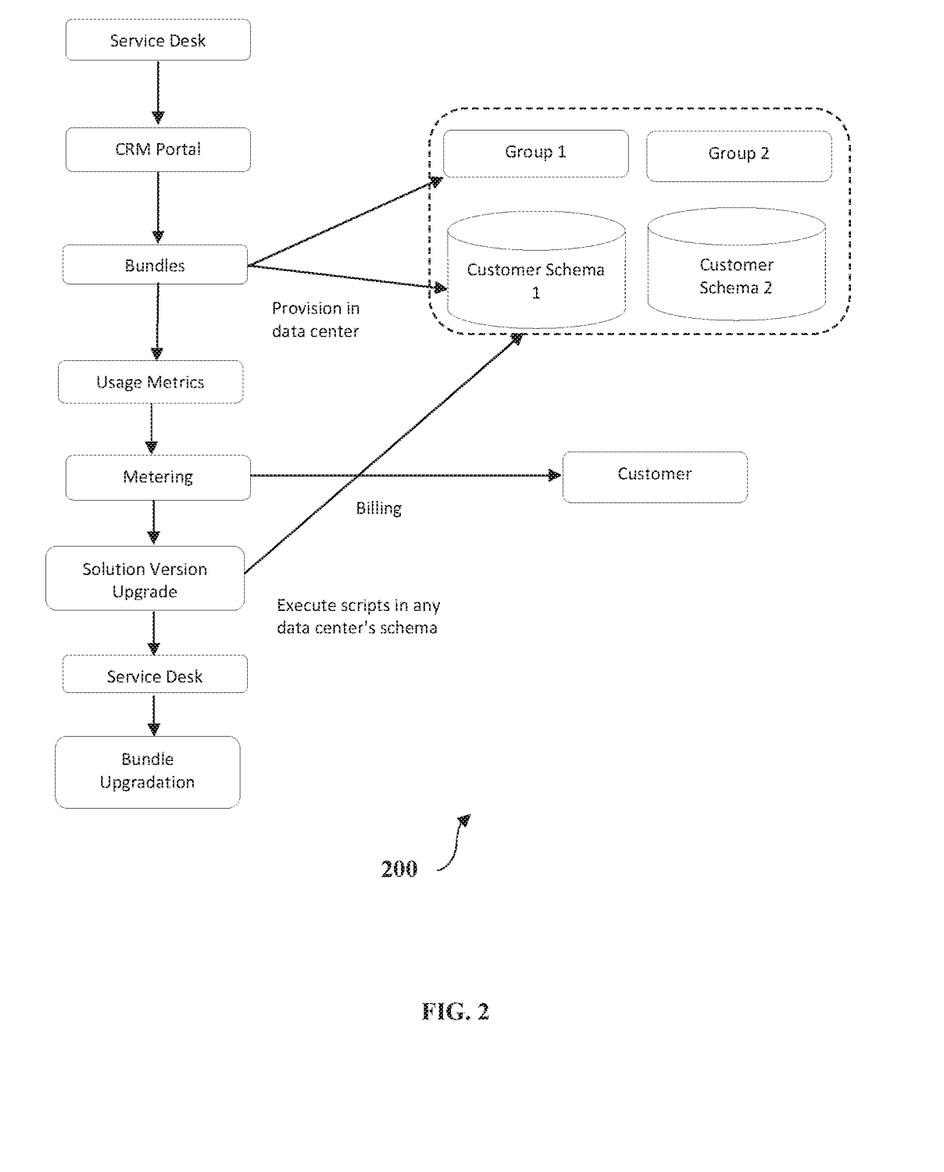
FIG. 2 illustrates an exemplary architecture for provision, upgrade and track solutions in a multi tenanted platform according to embodiments of the present disclosure.

FIG. 2 illustrates an exemplary architecture 200 to provision, upgrade and track solutions in a multi tenanted platform according to embodiments of the present disclosure. In an embodiment, a request for set of solutions is received at a service desk for a user (e.g., a customer). A ticket is generated for the request associated with at least one solution from the set of solutions. For example, ticket is logged in a Customer relationship management (CRM) solution to keep track of the request. A bundle is selected based on the requested solution by the user. The selected bundle associated with the ticket for the requested solution is provisioned by a provisioning component to obtain a provisioned bundle. In an embodiment, the provisioned bundle includes a provisioning queue table which is stored in a schema.

In an embodiment, a user account for an admin is created for an organization and subsequently communication mail is sent to the admin with login credentials. Based on the user account, admin creates plurality of the users for the organization. In an embodiment, an admin user created is mapped to a predefined user group which allows access to various functionalities/modules of the solutions provisioned. In an embodiment, the schema to store tables is created for the organization. For example, the schema is created in Master and slave database servers. The master database server is the main database server used for everyday transactions. The slave database server is used for reports. In an embodiment, multiple servers in the provisioning framework are configured to determine correct server internally and create schema.

A scheduler is configured to schedule the provisioning queue table at a predefined interval to obtain plurality of provisioning records e.g., a bundle name, an organization ID, an organization name, a data center ID, an organization group ID, an admin user ID, and a provisioning status. An executor component (Not shown in Figure) is configured to determine at least one class for the provisioned bundle from the plurality of provisioning records. In an embodiment, the class corresponds to at least one of (i) bundle level class, (ii) solution specific class, and combination thereof. In an embodiment, the at least one requested solution and a solution table created in the schema is provisioned. In an embodiment, status of the provisioning is updated and notified to the user. In an embodiment, the solutions requested by the customer are provisioned. A solution specific tables are created in the schema and day 0 scripts required for the provisioned solutions are also executed.

In an embodiment, pre-configured workflow is provisioned for the selected at least one requested solution solutions. In an embodiment, a plurality of reports which are defined for the provisioned solutions are also provisioned for the customer. For example, the provisioning framework makes an internal call to an API's registered by the solution teams. Further, the APIs ensures a step of configuring the report for the organization. In an embodiment, while provisioning the solution requested by the customer, the provisioning framework is configured to perform an internal call to the solution API which creates folders/files as required to generate a file system for an organization. In an embodiment, a plurality of usage metrics data (e.g., number of widgets created, number of customer joined in a group etc.) is populated based on weekly/monthly usage of the customer. In an embodiment, billing is generated based on the customer usage. In an embodiment, a plurality of scripts are executed in any environment and in the schema to enhance associated solution functionalities. In an embodiment, the request is received from the customer for additional solutions and tickets are logged in a CRM portal to keep track of this request. Further, the tickets may be closed upon the additional provisioning request are completed.

Figure 3A:
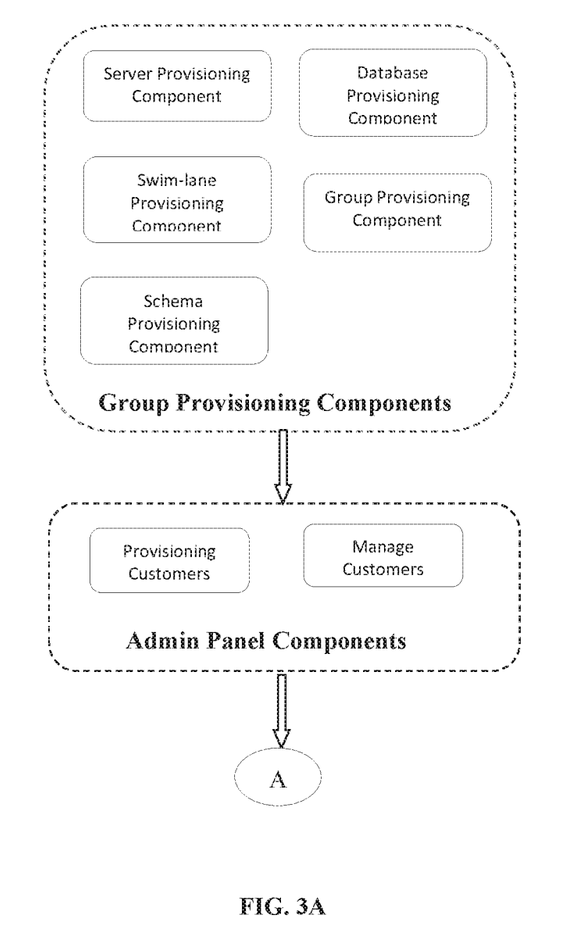
FIG. 3A-3C illustrates an exploded view of plurality of provisioning components according to embodiments of the present disclosure.
Figure 3B:
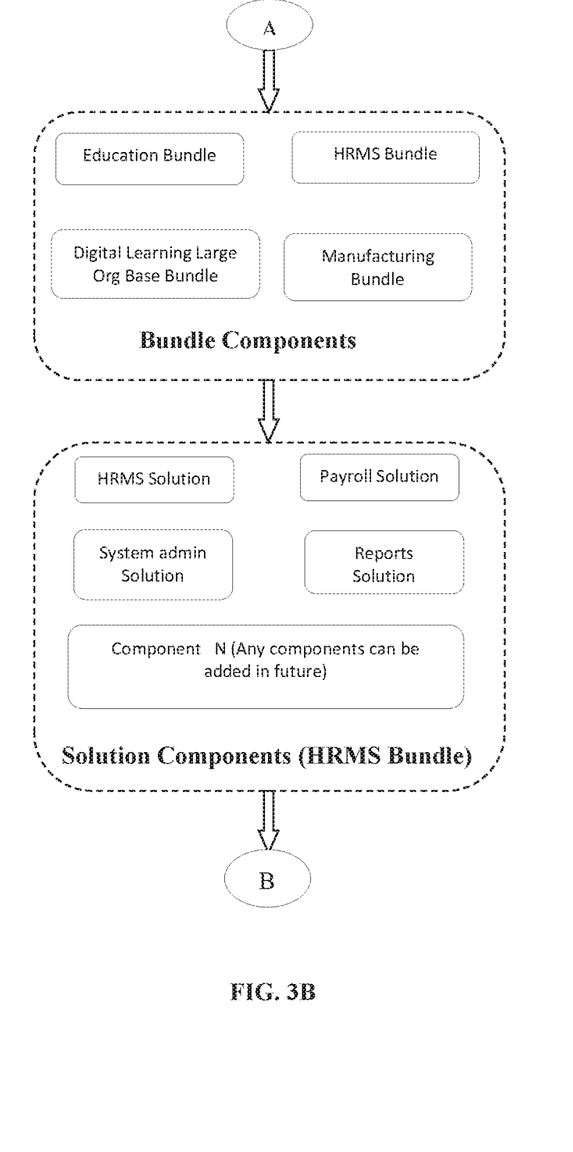
Figure 3C:
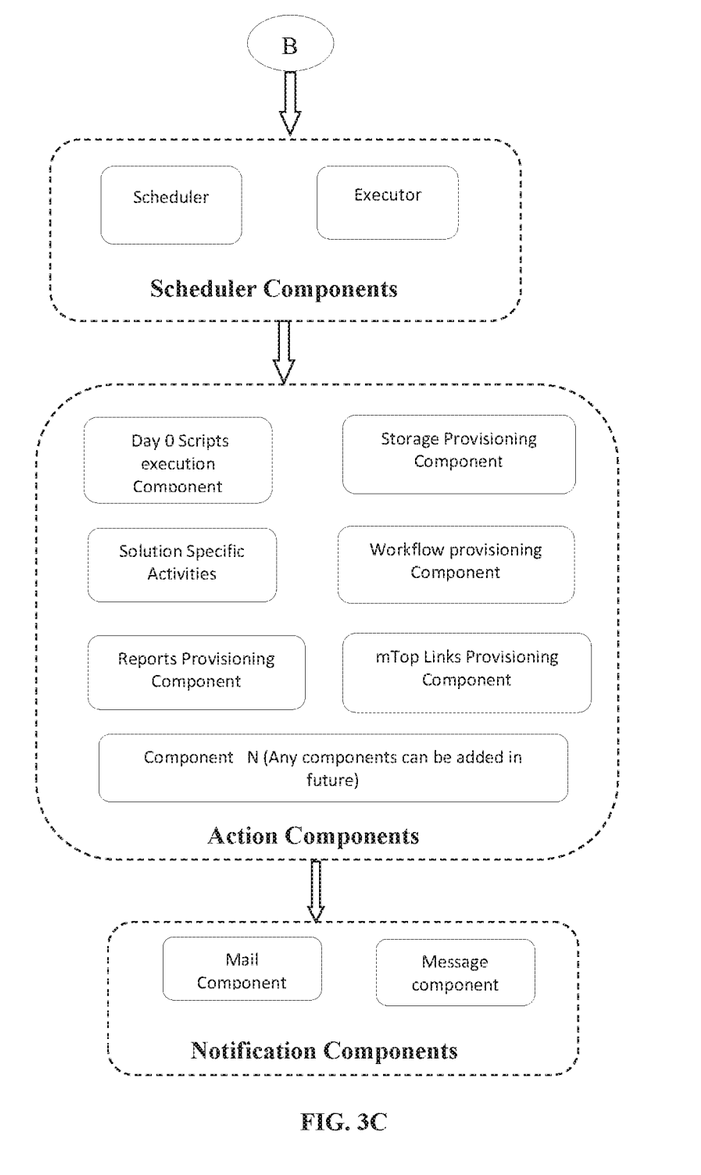

FIG. 3A-3C illustrates an exploded view of plurality of provisioning components according to embodiments of the present disclosure. In an embodiment, the plurality of provisioning components and subcomponents are involved in a cloud based multi-tenanted platform.

1. Active-Active Data Centers:

An active-active data center is configured to enable business to improve system availability, reduce or eliminate disruptions in service and provide quick and reliable failover in case of an outage due to a disaster. In an embodiment, the system includes multiple groups where the customer is provisioned. For example, whenever any customer provisioning request is received, the framework automatically finds out which group includes relatively less customers and provisions in that group. Further, based on the customer request, provisioning is performed in a particular data center.

2. CRM Integration for Provisioning:

In an embodiment, the Service desk logs a ticket in the CRM portal upon receiving a request from the customer. Further, based on the raised ticket, plurality of solutions which are requested by customers are provisioned. The plurality of provisioning components are as follows:

Group Provisioning Components:

In an embodiment, sub components of the group provision components are: a) Server Provisioning Component in which new servers and logical databases are created to serve a new group, b) Database provisioning Component in which new database configurations are created to serve the request for new group, c) Swim-lane Provisioning Component in which new swim-lanes are created for the new group, d) Group Provisioning Component in which new Group are created to serve the new organizations, and e) Schema Provisioning Component in which new Group specific schema's are created to store the group specific common metadata's.

Admin Panel Components:

The admin Panel component is configured to provide a front end to provision a customer and to manage the customers. In an embodiment, the admin Panel component is configured to provision the customer upon receiving a request. In an embodiment, one or more solutions can be added to the organizations based on the request. The admin Panel component involves editing the organization name, changing the status of the organization, editing the organization's admin user account and support user account.

Bundle Components:

The bundle components are logical group of solutions. For example, "HRMS BASE Bundle" includes HRMS, Payroll, System Admin, Reports solution. The components include one or more bundles which can be provisioned at any point of time in a single click. In an embodiment, the bundle components can be base bundle components or "Add on" Bundle components.

a) Base bundle Components: In an embodiment, the base bundles can work independently e.g., Manufacturing Bundles, Education Bundles; b) Add on bundle components in which the customers can add on any solutions after using the solutions which they have requested. Further, the components that can be added to the base bundles e.g., Feedback add on bundle, digital learning add on bundle.

In an embodiment, solution Components are actual components which serves the actual customers request. In an embodiment, the solution components can be added to the bundle at any point of time and can be provisioned to any customers by upgrading the bundle e.g., HRMS Solution, Campus Management Solutions, Manufacturing, Finance & Accounting.

Scheduler Components consider an input from the provisioning request table and trigger the executor component. The executor component is configured to provision the necessary components and a new organization.

(a) Scheduler Component—A separate scheduler is created for the provisioning framework and configured to run in frequent intervals. The scheduler fetches the queued data and call the executor component.

(b) Executor Component is configured to implement provisioning process after receiving the request from the scheduler component.

Action Components:

In an embodiment, the action components involved in a provisioning process are at least one of: (a) Day 0 Scripts Component which executes Day 0 Scripts for all solutions which belongs to a selected bundle; (b) Storage Provisioning Component is configured to create a storage system to store the images, templates, and all files utilized in plurality of solutions; (c) Workflow Provisioning Component is configured to copy applications workflow from default organization (e.g., Org 1) to a new organization; (d) Reports Provisioning Component is configured to create the default reports for an organization from default organization; (e) mTop links provisioning component is configured to provision default mTop components e.g., use-cases, web-links, RSSfeeds; (f) Solution specific component differ based on the solutions which are provisioned inside a bundle, for example, some solution creates XML files and some solution maps the default user groups to the users of the organizations; and (g) Default component are provisioned for all the bundles. In an embodiment, the mTop corresponds to a solutions accessed in a hand-held devices (e.g., a mobile phone, a Tablet).

In an Embodiment, the Action Items in Default Component are at Least One of:
a) Organization is created
b) Organization preferences such as language, and time zone are configured
c) Admin User of the organization is created
d) Organization Admin User Preferences like language, timezone etc of the admin user is configured
e) Organization support user accounts are created
f) Organization support user preferences are configured
g) Master DB registry for the organization is configured and Org Schema is created on the respective DB vertical
h) Slave DB registry for the organization is configured
i) Crosstalk application is mapped to the organization
j) Default Webtop profile is created for the organization
k) Mapping between the webtop profile and the applications is done
l) Mapping between the webtop profile and the users is done
m) Mapping of the users to Application's user group is done
n) Execution of default Password Policy for the new Organization from the preconfigured Script file.

In an embodiment, the notification Component is configured to notify updated status of provisioning and notification are sent to the customer through at least one of: (a) Mail Component—Notification mail can be sent to the registered users after the provisioning of the bundle; and b) Message Component—Notification Message can be sent to the registered users after the provisioning of the bundle.

Figure 4A:
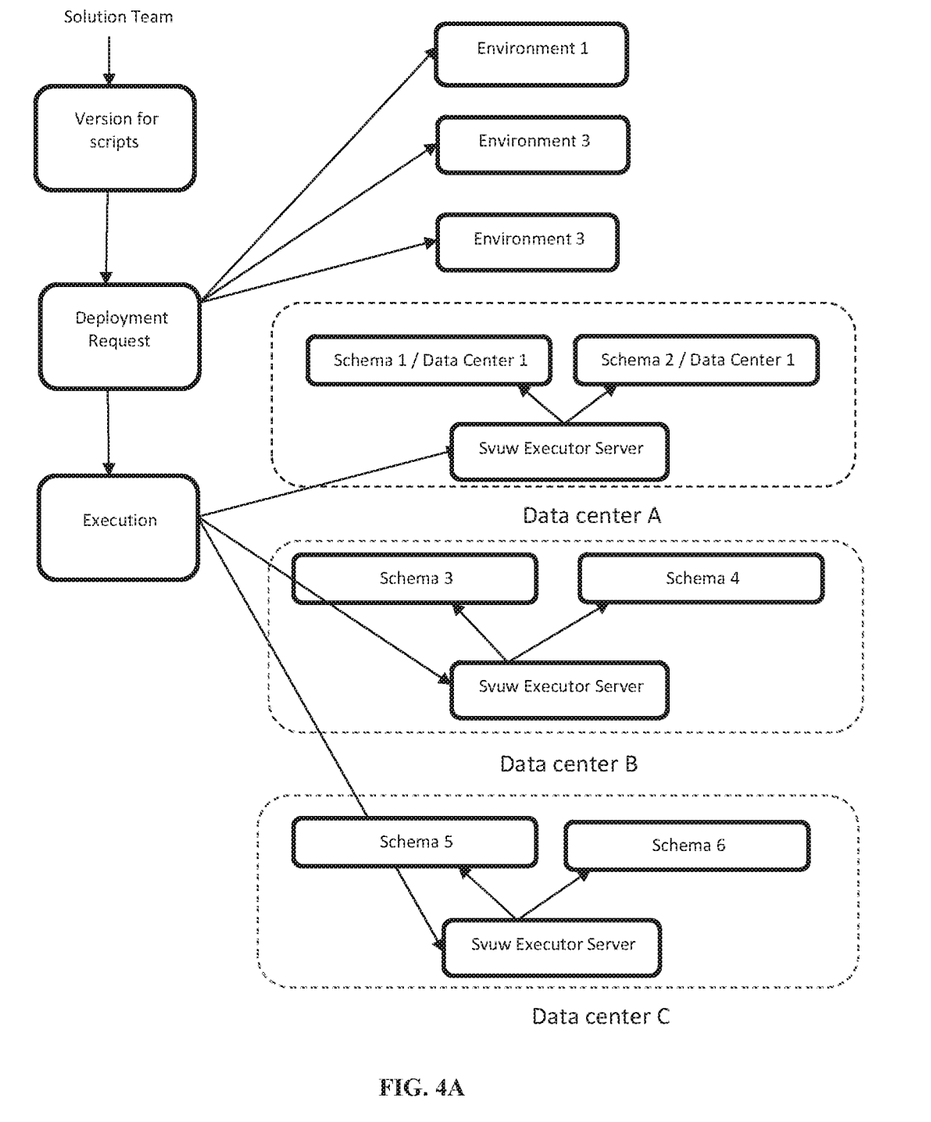
FIG. 4A illustrates an exemplary block diagram of a solution version upgrade component according to embodiments of the present disclosure.

FIG. 4A illustrates an exemplary block diagram of a solution version upgrade component according to embodiments of the present disclosure. The solution version upgrade component is configured to automatically execute scripts in any environment, any data center and any schema to upgrade or enhance the solution functionalities.
(a) Environment Component in which user can execute the scripts in all available environments automatically.
(b) Version Component in which user can create a version for their scripts which needs to be executed on the specific schema and corresponding environments.
(c) Deployment Request Component in which deployment request can be created for an environment hence the particular scripts can be executed on that environment.
(d) Execution Component executes the script in corresponding environments mentioned in the deployment request.
(e) Access Restriction Component in which the user can restrict their tables from being altered or modified by other solution teams.
(f) Consolidation Component in which the user can consolidate their scripts automatically before sending it to other environments.

Figure 4B:
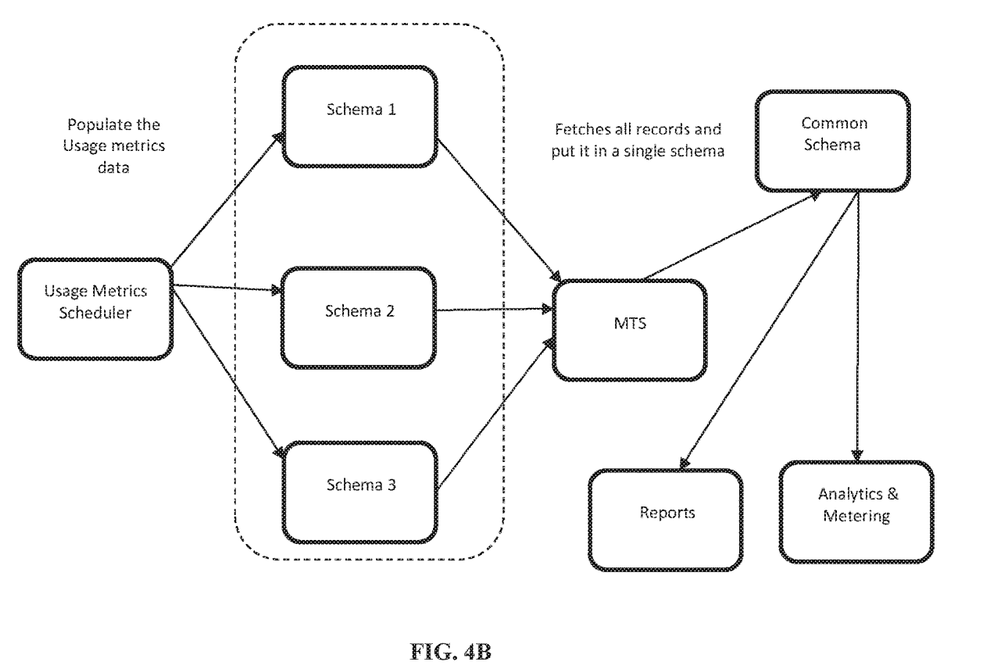
FIG. 4B illustrates an exemplary block diagram of a usage metrics component according to embodiments of the present disclosure.

FIG. 4B illustrates an exemplary block diagram of a usage metrics component according to embodiments of the present disclosure. The usage metrics is also provisioned at the time of customer provisioning. In an embodiment, the usage metrics data are populated based on weekly or monthly usage of our solutions. Based on the usage metrics data, billing can be generated per customer.

Figure 5A:
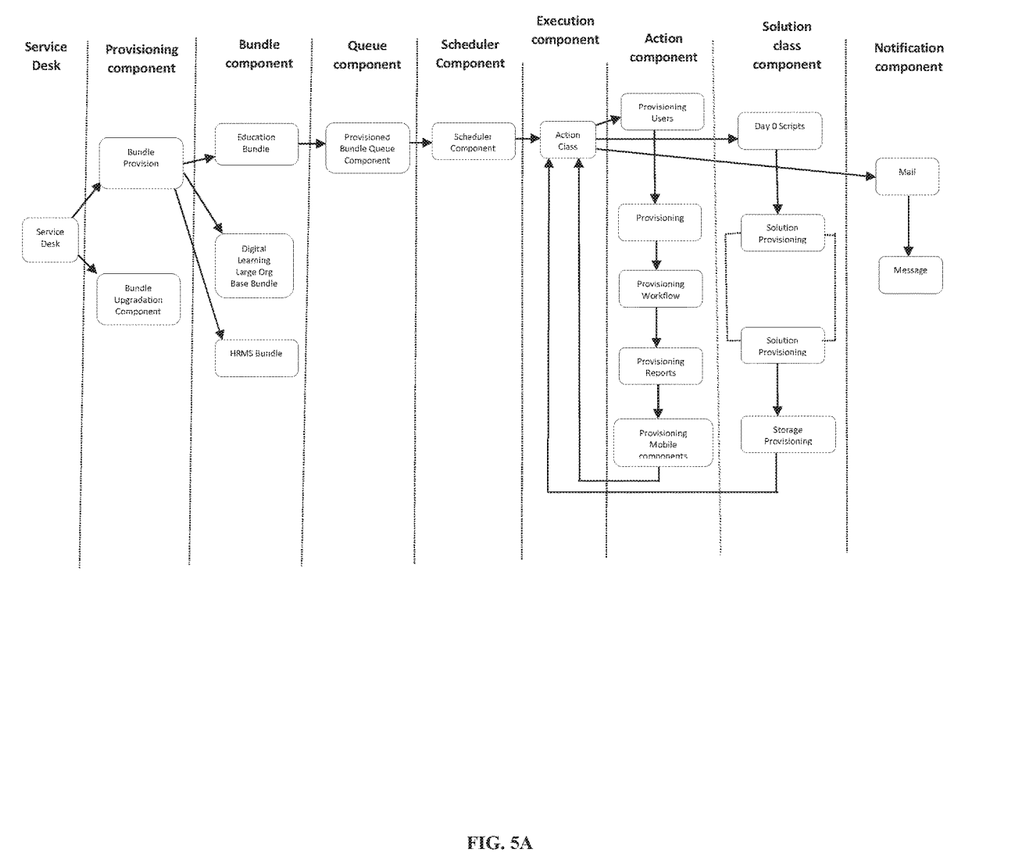
FIG. 5A-5B is an exemplary flow diagram illustrating a method for provisioning, upgrading and tracking solutions in the multi tenanted platform according to embodiments of the present disclosure.
Figure 5B:
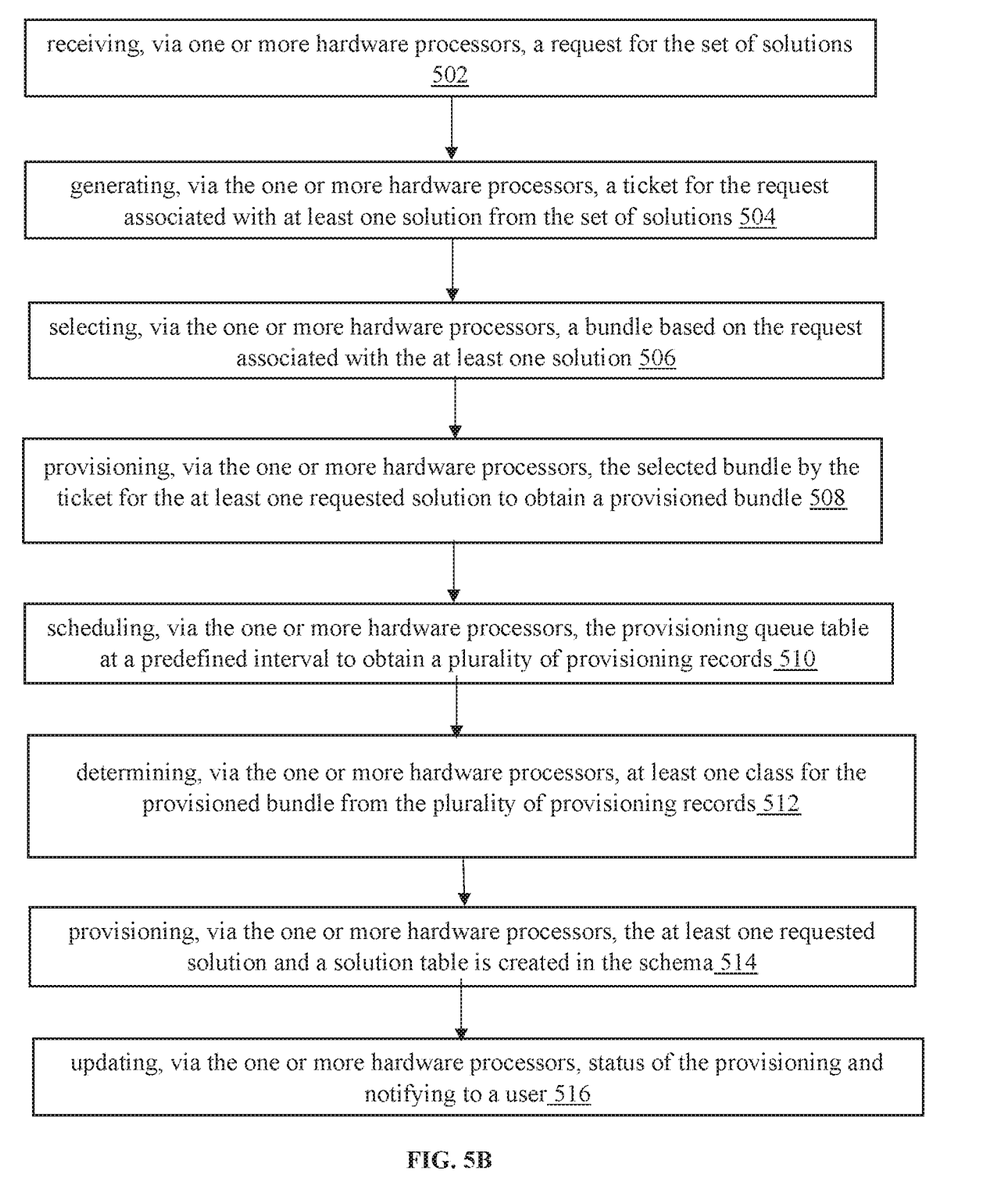

FIG. 5A-5B is an exemplary flow diagram illustrating a method for provisioning, upgrading and tracking solutions in the multi tenanted platform according to embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description.

The steps of the method of the present disclosure will now be explained with reference to the components of the system 100 as depicted in FIG. 1. At step 502, the one or more hardware processors 104, a request for the set of solutions is received. At step 504, the one or more hardware processors 104, a ticket is generated for the request associated with at least one solution from the set of solutions. At step 506, the one or more hardware processors 104, a bundle is selected based on the request associated with the at least one solution. At step 508, the one or more hardware processors 104, the selected bundle is provisioned by the ticket for the request associated with the at least one to obtain a provisioned bundle. In an embodiment, the provisioned bundle includes a provisioning queue table which is stored in a schema. At step 510, the one or more hardware processors 104, the provisioning queue table is scheduled by a scheduler, at a predefined interval to obtain plurality of provisioning records. At step 512, the one or more hardware processors 104, at least one class for the provisioned bundle from the plurality of provisioning records is determined by an executor component. In an embodiment, the class corresponds to at least one of (i) a bundle level class, (ii) a solution specific class, and combination thereof. At step 514, the one or more hardware processors 104, the at least one requested solution and a solution table is created in the schema is provisioned. At step 516, the one or more hardware processors 104, status of the provisioning is updated and notified to a user.

In an embodiment, a solution provisioning class may execute at least one script in a newly created schema to perform solution specific activities. In an embodiment, the method may further include provisioning a pre-configured workflow for the selected solution. In an embodiment, the method may further include provisioning a report for the provisioned solutions.

Embodiments of present disclosure herein address unresolved problem of manual work i.e. by allowing the users to be provisioned and configured without manual work and can be upgraded at any point of time. The embodiments of present disclosure herein support in adding new functionalities without any manual invention. Further, any new components can be plugged at any point of time without affecting the functionality. The embodiments of present disclosure herein provide the support to upgrade one or more feature across solutions which are provisioned earlier. The embodiments of present disclosure herein automate end to end process of customer onboarding, upgradation and tracking. Entire process is automated so manual work is not required and resulting in error free. The embodiments of present disclosure herein highlight a back-end process and provides end to end touch free provisioning and are done through a provisioning framework. The embodiments of present disclosure herein support provisioning of a customers in a multitenant cloud based architecture. The embodiments of present disclosure herein provide a support for provisioning of one or more customers simultaneously.

The embodiments of present disclosure herein provide a support to manage entire life cycle of the customer's in a multi tenanted environment. The embodiments of present disclosure herein provide features across solutions that can be upgraded to any customer without affecting the other customers in a multi tenanted environment. The embodiments of present disclosure herein provide an active-active data center architecture which enables business to improve system availability, reduce or eliminate disruptions in service and provide quick, and reliable failover in case of an outage due to a disaster. The embodiments of present disclosure enable a support in metering solution which also be provisioned and can easily find out the usage of all the functionalities in the solutions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of provisioning a set of solutions in a multi tenanted platform, comprising:
   a) receiving, via one or more hardware processors, a request for the set of solutions;
   b) generating, via the one or more hardware processors, a ticket for the request associated with at least one solution from the set of solutions;
   c) selecting, via the one or more hardware processors, a bundle based on the request associated with the at least one solution;
   d) provisioning, via the one or more hardware processors, the selected bundle by the ticket for the at least one requested solution to obtain a provisioned bundle, wherein the selected bundle associated with the ticket for the requested solution is provisioned by at least one provisioning component of a plurality of provisioning components to obtain a provisioned bundle, wherein the provisioned bundle comprises a provisioning queue table which is stored in a schema;
   e) scheduling, by a scheduler via the one or more hardware processors, the provisioning queue table at a predefined interval to obtain a plurality of provisioning records, wherein the scheduler is executed at the predefined interval to fetch queued data from the queue table; and trigger an executor to implement a provisioning process, wherein the executor is configured to determine at least one solution provisioning class for the provisioned bundle from the plurality of provisioning records;

f) determining, by the executor via the one or more hardware processors, the at least one solution provisioning class for the provisioned bundle from the plurality of provisioning records, wherein the at least one solution provisioning class corresponds to at least one of (i) a bundle level class, (ii) a solution specific class, and combination thereof;

g) provisioning, via the one or more hardware processors, the at least one requested solution and a solution table created in the schema, wherein at least one script is executed, by the solution provisioning class, in a newly created schema to perform solution specific activities; and h) updating, via the one or more hardware processors, status of the provisioning and notifying to a user.

2. The processor implemented method as claimed in claim 1, further comprising provisioning a pre-configured workflow for the selected solution.

3. The processor implemented method as claimed in claim 1, further comprising, provisioning a report for the provisioned solutions.

4. A system (100) to provision set of solutions in a multi tenanted platform, wherein the system comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

a) receive, a request for the set of solutions;

b) generate, a ticket for the request associated with at least one solution from the set of solutions;

c) select, a bundle based on the request associated with the at least one solution;

d) provision, the selected bundle by the ticket for the at least one requested solution to obtain a provisioned bundle, wherein the selected bundle associated with the ticket for the requested solution is provisioned by at least one provisioning component of a plurality of provisioning components to obtain a provisioned bundle, wherein the provisioned bundle comprises a provisioning queue table which is stored in a schema;

e) schedule, by a scheduler, the provisioning queue table at a predefined interval to obtain a plurality of provisioning records, wherein the scheduler is configured, at the predefined interval to fetch queued data from the queue table; and trigger an executor to implement a provisioning process, wherein the executor is configured to determine at least one solution provisioning class for the provisioned bundle from the plurality of provisioning records;

f) determine, by the executor, the at least one solution provisioning class for the provisioned bundle from the plurality of provisioning records, wherein the at least one solution provisioning class corresponds to at least one of (i) a bundle level class, (ii) a solution specific class, and combination thereof;

g) provision, the at least one requested solution and a solution table created in the schema, wherein at least one script is executed, by the solution provisioning class, in a newly created schema to perform solution specific activities; and h) update, status of the provisioning and notify to a user.

5. The system as claimed in claim 4, wherein the one or more hardware processors are further configured to provision a pre-configured workflow for the selected solution.

6. The system as claimed in claim 4, wherein the one or more hardware processors are further configured to provision a report for the provisioned solutions.

7. One or more non-transitory machine-readable information storage mediums comprising one or more instructions, which when executed by one or more hardware processors cause:

a) receiving, a request for the set of solutions;

b) generating, a ticket for the request associated with at least one solution from the set of solutions;

c) selecting, a bundle based on the request associated with the at least one solution;

d) provisioning, the selected bundle by the ticket for the at least one requested solution to obtain a provisioned bundle, wherein the selected bundle associated with the ticket for the requested solution is provisioned by at least one provisioning component of a plurality of provisioning components to obtain a provisioned bundle, wherein the provisioned bundle comprises a provisioning queue table which is stored in a schema;

e) scheduling, by a scheduler, the provisioning queue table at a predefined interval to obtain a plurality of provisioning records, wherein the scheduler is executed at the predefined interval to fetch queued data from the provisioning queue table; and trigger an executor to implement a provisioning process, wherein the executor is configured to determine at least one solution provisioning class for the provisioned bundle from the plurality of provisioning records;

f) determining, by the executor the at least one solution provisioning class for the provisioned bundle from the plurality of provisioning records, wherein the at least one solution provisioning class corresponds to at least one of (i) a bundle level class, (ii) a solution specific class, and combination thereof;

g) provisioning, the at least one requested solution and a solution table created in the schema, wherein at least one script is executed, by the solution provisioning class, in a newly created schema to perform solution specific activities; and h) updating, status of the provisioning and notifying to a user.

8. The one or more non-transitory machine-readable information storage mediums as claimed in claim 7, comprises one or more instructions, which when executed by the one or more hardware processors cause provisioning a pre-configured workflow for the selected solution.

9. The one or more non-transitory machine-readable information storage mediums as claimed in claim 7, comprises one or more instructions, which when executed by the one or more hardware processors cause provisioning a report for the provisioned solutions.

10. The method of claim 1, wherein the plurality of provisioning components comprise: a) Server Provisioning Component to create at least one new server and one or more logical databases to serve a new group, b) Database provisioning Component to create a new database configuration to serve a request for the new group, c) Swim-lane Provisioning Component to create new one or more swim-lanes for the new group, d) Group Provisioning Component to create at least one new Group to serve at least one new organization, and e) Schema Provisioning Component to create new Group specific schema's to store the group specific common metadata's.

11. The method of claim 10, wherein the plurality of provisioning components further comprise action components, and the action components involved in the provisioning process are at least one of: (a) Day 0 Scripts Component which executes Day 0 Scripts for all solutions which belongs to the selected bundle; (b) Storage Provisioning Component configured to create a storage system to store images, templates, and a plurality of files utilized in plurality of solutions; (c) Workflow Provisioning Component configured to copy applications workflow from default organization to the new organization; (d) Reports Provisioning Component configured to create default reports for an organization from default organization; (e) mTop links provisioning component configured to provision default mTop components comprising use-cases, web-links, RSSfeeds.

12. The method of claim 11, wherein the plurality of provisioning components further comprise default component provisioned for all the bundles, wherein action items in default component are at least one of: a) Creating an organization, b) Configuring organization preferences comprising a language, and a time zone; c) Creating an admin user of the organization; d) Configuring an Organization Admin User Preferences comprising a language, a time zone of the admin user; e) Creating an Organization support user accounts f) Configuring an Organization support user preferences; g) Configuring a Master DB registry for the organization and Org Schema on a respective DB vertical; h) Configuring a Slave DB registry for the organization i) Mapping a Crosstalk application to the organization; j) Creating a Default Webtop profile for the organization; k) Mapping between the webtop profile and the applications l) Mapping between the webtop profile and the users; m) Mapping of the users to Application's user group; n) Execution of default Password Policy for the new Organization from the preconfigured Script file.

* * * * *